Patented Nov. 20, 1928.

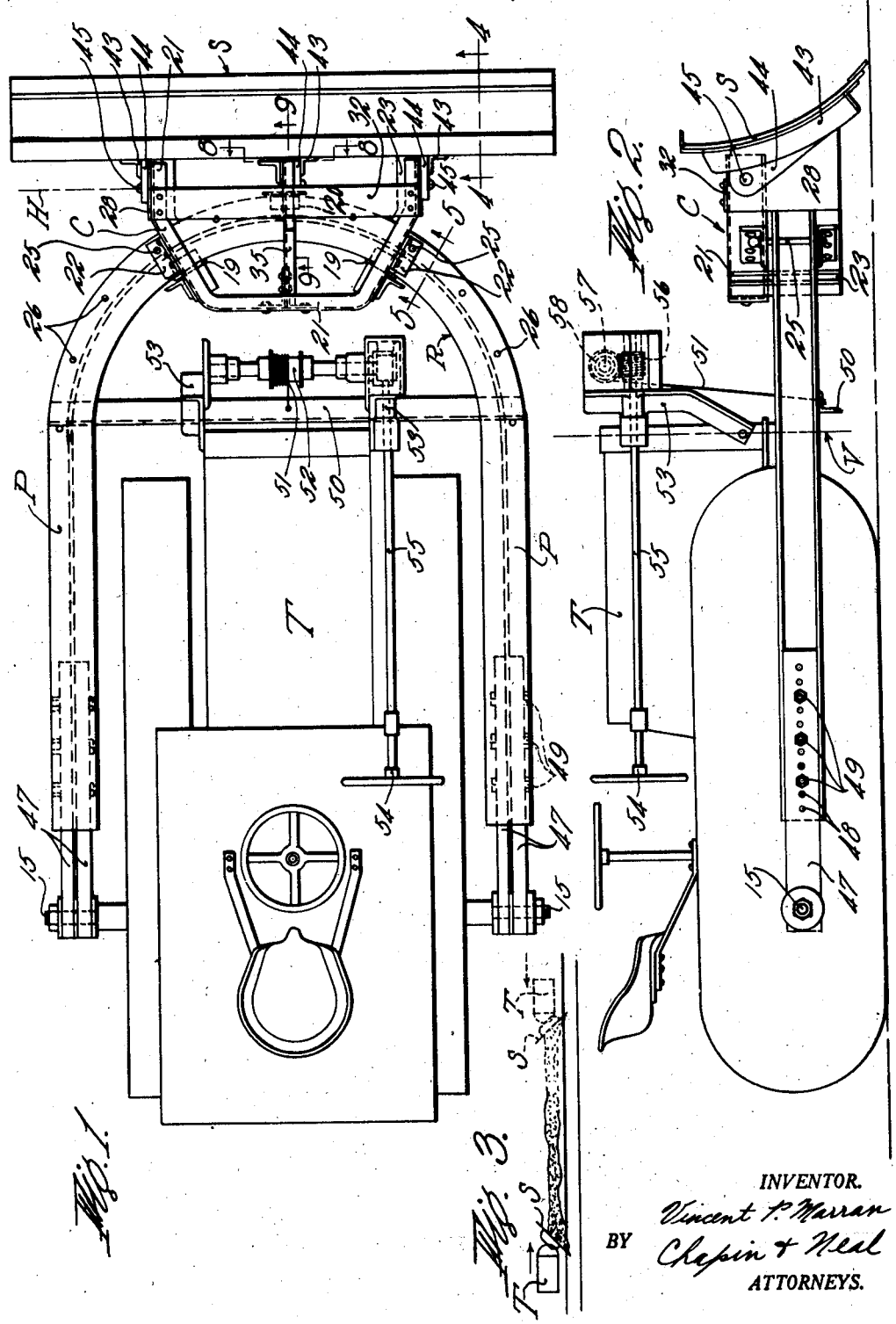

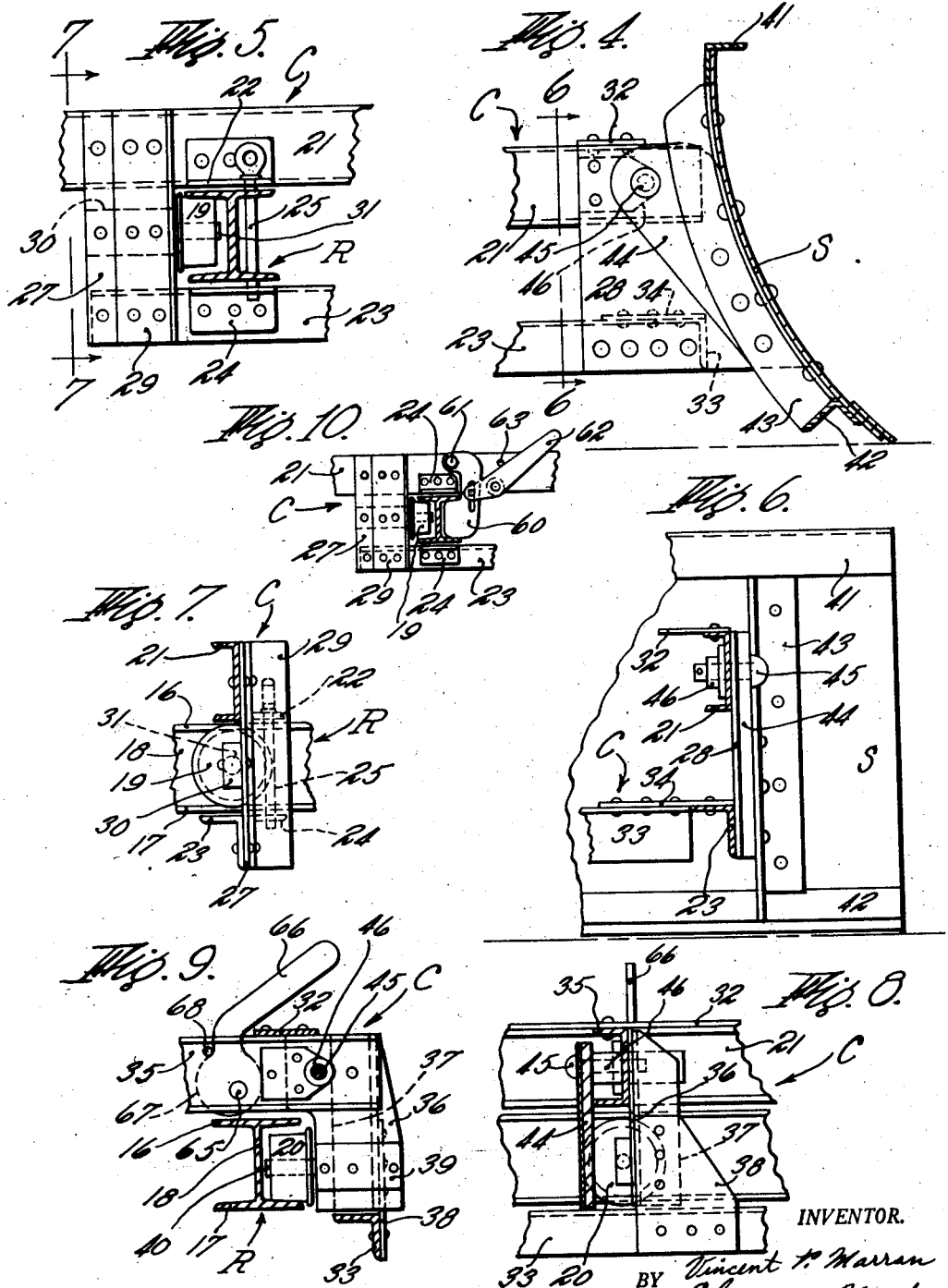

1,692,750

UNITED STATES PATENT OFFICE.

VINCENT P. MARRAN, OF HOLYOKE, MASSACHUSETTS.

TRACTOR-DRIVEN SCRAPER.

Application filed March 15, 1927. Serial No 175,521.

This invention relates to improvements in scrapers of the type adapted to be driven by a tractor and designed for various uses such, for example, as filling trenches, levelling ground, scraping roads and so forth.

The scraper of this invention, in common with those of the prior art, includes a blade adapted to be pushed by and ahead of the tractor. It also embodies provisions for the blade to swing, within limits, about a horizontal axis, so that the scraper will not drag dirt back with it and can ride over dirt, stones or other obstructions in its path, when the tractor moves backwardly.

Starting with this prior art basis, the invention is directed to, and has for an object the provision of, a tractor-driven scraper which embodies an angularly adjustable scraper blade designed to be set in various positions to perform various kinds of work. Particularly, the blade can be set at right angles to the longitudinal center line of the tractor or at various acute angles on either side of such center line. The provision for setting the blade at an angle to the center line of the tractor enables the scraper to be adapted for filling trenches in a much more rapid and efficient manner than when the blade is set at right angles in accordance with prior practice.

Other objects of the invention relate to constructional features incident to the general object above set forth. In carrying out the general object, I make use of an approximately semi-circular trackway, desirably H-shape in cross section, which is connected to a pair of push bars pivotally connected to the tractor one on each side thereof. On this trackway, a carriage is mounted so that it can be rolled easily into various positions of angular adjustment and the scraper blade is pivotally connected to the carriage for limited swinging movement about a horizontal axis. Means are provided for locking the carriage in its various positions of adjustment and means are also provided for raising and lowering the trackway to adjust the height of the scraper blade.

Other objects and advantages will appear in the following description and will be pointed out in the appended claims.

The invention will be disclosed with reference to the one illustrative embodiment of it in the accompanying drawings, in which:

Figs. 1 and 2 are plan and elevational views of a tractor-driven scraper embodying my invention;

Fig. 3 is a diagrammatical view illustrative of one use of the invention;

Figs. 4 and 5 are sectional elevational views taken on the lines 4—4 and 5—5, respectively, of Fig. 1;

Fig. 6 is a cross sectional view taken on the line 6—6 of Fig. 4;

Fig. 7 is a cross sectional view taken on the line 7—7 of Fig. 5;

Figs. 8 and 9 are cross sectional elevational views taken on the lines 8—8 and 9—9, respectively, of Fig. 1; and Fig. 10 is a view taken similarly to Fig. 5 and illustrative of a modification in detail.

Referring to these drawings and particularly to Figs. 1 and 2 thereof, T represents a tractor, of any suitable type and S the scraper, which may also be of any suitable type, although the type illustrated is at present preferred. The scraper is pivotally connected to a carriage C for limited swinging movement about the horizontal axis H (Fig. 1) and this carriage is mounted to roll on a semi-circular trackway R in such a fashion that it may swing about the vertical axis V (Fig. 2) into various positions of angular adjustment. The trackway R is rigidly connected at its ends to a pair of push bars P and, by preference, is integral with such push bars although this of course is not essential. The push bars are disposed one on each side of the tractor and the trackway R in front of the tractor. The rear ends of the push bars may be connected to the tractor in any suitable way and at any suitable point although I prefer to pivotally connect these bars to the tractor, as indicated at 15, so that the entire U-shaped frame, comprising the push bars P and trackway T, can swing about a horizontal axis.

Mechanism is provided for raising and lowering the last named frame and holding it in various positions of vertical adjustment, whereby the lower edge of scraper S may be caused to lie at various levels above the level of the ground within a considerable range, which is ample for all practical purposes. By the provision for angular adjustment of carriage C about the vertical axis V, the scraper may be positioned at right angles to the path of travel of the tractor, as illustrated, or it may be moved to the right or to the left of such position (see Fig. 3) so as to lie at various acute angles with respect to the path of travel of the tractor. By the provision for swinging movement of the scraper S about the axis H, the scraper can rock upwardly to ride over obstructions, such as stones or piles of dirt when the tractor is backed without dragging them back. If the range of rocking movement of the scraper relatively to carriage C is not sufficient for the purpose, then the entire assembly comprising the scraper, carriage and the frame, comprising the push bars P and connected trackway R, can swing upwardly about the pivot points 15.

Referring to the construction in detail, the push bars P and trackway R are preferably made up from a length of H-column by bending the same intermediate its ends into the U-shaped form clearly shown in Fig. 1. The H-column section, comprises upper and lower flanges 16 and 17, which are wide and heavy, and a central connecting web 18. Thus, as shown in Figs. 5 and 9, there are inner and outer trackways to receive inner and outer flanged rolls 19 and 20, respectively, which rolls are mounted, as will appear, on carriage C. As shown in Fig. 1, there are two inner rolls 19 and one outer roll 20 located centrally between but forwardly of the inner rolls. As shown in Fig. 5, each inner roll 19 normally bears on the upper flange 16 while the outer roll 20 normally bears on the lower flange 17 and on the opposite side of web 16, as shown in Fig. 9.

The carriage C includes a channel iron 21 bent as shown to afford a central straight portion with outwardly diverging portions, terminating with parallel ends which are pivotally connected to the scraper S. This channel overlies the upper flange 16 of the H-column and carries small angle irons 22, secured one to the outer face of each diverging portion of the channel. Underlying each of said diverging portions and the H-column trackway is an angle iron 23 to which is secured a small angle iron 24. The horizontal legs of angle irons 22 and 24 overlie and underlie, respectively, the upper and lower flanges 16 and 17 in closely adjacent relation. Such legs have alined holes therein, which are adapted to register with any one of a series of holes provided in the upper and lower flanges 16 and 17 of the H-column trackway, whereby a pin 25 may be passed downwardly through the alined holes in angle iron 22, flanges 16 and 17 and angle iron 24. The upper series of holes, formed in flange 16, are shown at 25 in Fig. 1 and these are so spaced that carriage C can be moved about axis V into a plurality of positions on either side of the central position shown and so that in every such position the frame can be held to the trackway R by two pins 25. Thus, as shown, the scraper S may assume three angular positions to the right of the central position and three to the left of such position.

Each angle iron 23, above referred to, is rigidly connected at opposite ends to the overlying channel iron 21 by plates 27 and 28. The plate 27 is reinforced by an angle iron 29 attached to one face thereof and secured to the opposite face thereof is a bracket 30, carrying a stud 31, on which roll 19 is rotatably supported. The forward ends of the channel 21 are connected and tied together by a plate 32 which is secured at its ends thereto and to the upper flanges thereof. The forward ends of the two laterally-spaced angle irons 23 are connected and tied together by an angle iron 33 which is secured at its ends by means of rivets and a gusset plate 34 to the angle irons 23. Rigidly connected at one end to the central straight part of the channel iron 21 and extending forwardly therefrom at right angles is a channel iron 35. The latter is connected by rivets to the described cross plate 32 and has riveted to the plane face of its web a depending plate 36 which is reenforced by an angle iron 37. The latter is connected by rivets and a gusset plate 38 to the described cross angle iron 33. Secured to the plate 36 is a bracket 39 which carries a stud 40 to rotatably support roll 20.

The blade of scraper S is reenforced along its upper and lower edges by horizontally disposed angle irons 41 and 42, respectively, which are secured to the back thereof. Also secured to the back of the scraper blade in laterally spaced relation are three vertically-disposed angle irons 43, which are curved to conform to the curvature of the blade. Riveted to each angle iron 43 is a plate 44 which extends rearwardly. The rearward extensions of the plates 44 are pivotally connected by pins 45 to front ends of carriage C, the two outer plates 44 being pivoted to the two front ends of the bent channel iron 21 and the central plate 44 being pivotally connected to the central channel iron 35. The bearings for the pins 45 in the channel irons may be supplemented by bearings, such as 46, secured to the channels. It is to be noted that the several pivot pins 45 are relieved of much of the strain to which they might otherwise be subjected during the forward movement of the scraper, because the plates 23 extend to and into abutment with the scraper blade and because the intermediate plate 44 abuts the angle iron 33. These plates 23 or 44 or both, form stops to limit the downward swinging movement of the scraper S relative to frame F. On a rearward movement of the scraper, it can swing upwardly until the central angle iron 43 abuts plate 32 as a stop, As hereinbefore set forth, the push bars P and connected trackway R are also mounted for swinging movement about a horizontal axis. This provision is primarily for the purpose of adjusting the level of the scraper blade but it does admit of a supplementary lifting of the scraper blade, on rearward movement, if the provision described for this purpose does not in itself suffice.

Each of the push bars P, at its rear end includes a pair of bars 47 provided with a plurality of longitudinally spaced holes 48 any of which are intended to receive bolts 49. Several such bolts are passed through the two bars 47 and the web of the H-column and serve to clamp these parts together. The arrangement is such that the effective length of the push bars may be increased or diminished as desired. The pivot pins 15, heretofore referred to, are received in the pairs of bars 47.

Connected at its ends to the push bars P and spanning the space therebetween is an angle iron 50. The latter is located just forwardly of the nose of the tractor and has connected thereto one end of a cable 51. The other end of the cable is connected to and wound upon a drum 52, rotatably supported in brackets 53 from the tractor. The drum may be manually turned from the driver's seat of the tractor by the hand wheel 54, connected to a shaft 55, which by worm 56 and gear 57 operates the shaft 58 of drum 52. By the hoisting mechanism described, the connected parts P and R may be raised and lowered and held in various positions of vertical adjustment.

As a useful refinement, I provide means for moving the rolls 19 and 20 away from their respective trackways after the carriage has been set in adjusted position. By this arrangement the carriage C when rolled into the desired position, can be held more firmly to the trackway R and the up and down play of the carriage eliminated. It will be seen that the weight of the scraper forces roll 20 against the lower flange 17 of the H-column trackway and forces the rolls 19 against the upper flange 16. Scraper S and carriage C may, however, be bodily lifted under some conditions and if this happens, the rolls 19 and 20 move back into engagement with the flanges 17 and 16, respectively, with an impingement which is liable to damage the rolls. Also the inward thrust imparted to carriage C when scraper S is performing heavy duty might possibly drive the flange of roll 20 against the edge of flange 17 and cause breakage of the roll flange. Consequently, I prefer to provide the devices, now to be described, to avoid these disadvantages. Such devices, while desirable and important, are not necessarily essential for all purposes, however.

Referring to Fig. 10, a plate 60 is pivoted at 61 to channel 21 adjacent each roll 19. This plate may be moved by a lever 62, having a pin and slot connection with the plate, into or out of the illustrated position. When positioned as shown, it fits between the flanges of the H-column on the opposite side of web 18 from roll 19 and serves to pull carriage C down and move roll 19 away from flange 16. A pin 63, inserted in a hole in channel 21, serves to lock the lever 62 in the illustrated position. When this pin is removed, lever 62 may be swung upwardly to withdraw plate 60 from between flanges 16 and 17, allowing roll 19 to reengage the flange 16.

In Fig. 9, I have illustrated another expedient for a similar purpose. Pivotally connected at 65 to channel 35 is a lever 66 having an eccentric portion 67. By swinging this lever to the left, the eccentric is caused to bear on the upper face of flange 16 and raise the central portion of carriage C enough to lift roll 20 free from flange 19. When the lever is so moved, a pin may be inserted in a hole 68 in channel 35 to hold lever 66 against unintentional return movement.

The scraper may be operated in several ways. When positioned as shown, viz., transversely to the line of travel of the tractor, it may be used for any scraping purpose, as for example, levelling ground, scraping roads or filling trenches. For the latter use, however, the tractor would have to be manœuvered many times in order to do the work. This is because the tractor has to move at right angles to the trench and first push the dirt into the trench, then recede and again move forwardly at a point further along the trench. Thus, for trench filling work the arrangement of the scraper at right angles to the line of travel of the tractor is poor because of the inordinate amount of manœuvering required. For this reason, I provide the means for angularly adjusting the scraper. By setting the scraper at an angle to the line of travel of the tractor, as shown in Fig. 3, the latter can move parallel with the trench and travel from one end to the other, pushing in the dirt as it goes. A much more rapid filling action results. Usually, it is desired to make a return trip along the trench for cleaning up purposes. In this case, the tractor would be turned around into the dotted line position but, when so turned, the position of the scraper will be such as to plow the dirt away from rather than into the trench. Therefore, before making the return trip, the pins 25 are pulled out and the carriage C rolled around the trackway R until the scraper S comes into the corresponding angular position on the opposite side of the longitudinal center line.

It is to be noted that when the scraper is set at an angle as shown in Fig. 3, it extends laterally outward beyond one side of the tractor to a considerable degree. This permits one end of the scraper blade to extend partially over the trench and yet enables the tractor to be located far enough back from the trench to prevent caving in of the side walls of the latter. Also, the brunt of the load is taken at the center of the scraper blade and such center lies well to one side of the longitudinal line of the tractor. When the blade is set at an angle, there results a component of force tending to throw the tractor laterally. By placing the center of load on the scraper blade well to one side of the longitudinal center line of the tractor, the latter pushes the blade forwardly by a thrust directed at an acute angle to its longitudinal center line so that there results a lateral component of force directed oppositely to, and designed to balance, the first named component of force. Thereby the tendency of the tractor to throw to one side, when the scraper is set at an angle, is avoided. The results described follow because the direction of thrust of the tractor on the scraper is not always straight ahead, as in prior practice, but is changed when the angle of the blade is changed and maintained always at right angles to the scraper blade.

The tractor-driven scraper of this invention is designed to do various kinds of work and to meet the various conditions arising therefrom. It is thus characterized by flexibility, being capable of adjustment so as to enable it to function in various ways and perform various kinds of work in the most expeditious and efficient manner.

The invention has been disclosed herein, in an embodiment at present preferred, for illustrative purposes but the scope of the invention is defined by the appended claims rather than by the foregoing description.

What I claim is:

1. A scraper, comprising, supporting and driving means adapted for attachment to a tractor, a carriage mounted on said means for angular adjustment relative thereto about a vertical axis, a blade pivoted to the carriage on a horizonal axis, and stops provided on said carriage to limit the rearward swinging movement of the blade and to abut the blade when the same is propelled forwardly, said blade being free to swing forwardly about its pivotal connection to said carriage while it is being drawn rearwardly.

2. A scraper, comprising a blade, a carriage supporting the blade, a frame adapted for connection to a tractor and affording a curved trackway, rolls on the carriage engaging said trackway, whereby the carriage may be rolled on the latter into various positions of adjustment, means for holding the carriage in any of said positions, and auxiliary means for supporting the carriage from the trackway and operable to relieve the rolls of the weight of the carriage.

3. A scraper, comprising a blade, a carriage supporting the blade, a frame adapted for connection to a tractor and affording a curved trackway, rolls on the carriage engaging said trackway, whereby the carriage may be rolled on the latter into various positions of adjustment, means for holding the carriage in any of said positions, and means for binding the carriage to the trackway and forcing the rolls out of engagement therewith.

4. A scraper, comprising a blade, a carriage for supporting the same, a pair of push bars substantially horizontally disposed and adapted at one end for attachment to a tractor one on each side thereof and connected together at their other ends by a semi-circular trackway on which said carriage is mounted to turn about a vertical axis, and means for locking said carriage to said trackway in various positions of angular adjustment.

5. A scraper, comprising, a blade, a U-shaped frame the legs of which form push bars adapted to extend one alongside each side of a tractor and to be connected thereto and the central portion forming a trackway, said last-named section being of H-shaped cross section having upper and lower flanges connected by a central upstanding web, a carriage to which said blade is connected and which in part overlies said upper flange, rolls mounted on the carriage for engaging the upper flange on one side of said web and the lower flange on the opposite side of said web, and means for holding the carriage to the trackway against rolling movement.

6. A scraper comprising, a blade, a U-shaped frame the legs of which form push bars adapted to extend one alongside each side of a tractor and to be connected thereto and the central portion forming a trackway, said last-named section being of H-shaped cross section having upper and lower flanges connected by a central upstanding web, a carriage comprising a frame having three laterally spaced arms which overlie said upper flange and which are connected at their forward ends to said blade, the outer arms each having a roll to ride on the lower and inner side of said upper flange and the central arm having a roll to ride on the upper and outer side of said lower flange, and means for locking the carriage against rolling movement on the trackway when desired.

7. A scraper comprising, a blade, a U-shaped frame the legs of which form push bars adapted to extend one alongside each side of a tractor and to be connected thereto and the central portion forming a trackway, said last-named section being of H-shaped cross section having upper and lower flanges connected by a central upstanding web, a carriage comprising a frame having three laterally spaced arms which overlie said upper flange and to which said blade is pivotally connected near its upper end, said last named frame including a pair of arms underlying said outer arms and the trackway together with front and rear upright connecting members, rolls mounted on the rear upright members to ride on the lower and inner side of said upper flange, a roll mounted on the central arm to ride on the upper and outer side of said lower flange, and means for locking the carriage against rolling movement on the trackway when desired.

8. A scraper comprising, a blade, a U-shaped frame the legs of which form push bars adapted to extend one alongside each side of a tractor and to be connected thereto and the central portion forming a trackway, said last-named section being of H-shaped cross section having upper and lower flanges connected by a central upstanding web, a carriage comprising a frame having three laterally spaced arms which overlie said upper flange and to which said blade is pivotally connected near its upper end, said last named frame including a pair of arms underlying said outer arms and the trackway together with front and rear upright connecting members, rolls mounted on the rear upright members to ride on the lower and inner side of said upper flange, a roll mounted on the central arm to ride on the upper and outer side of said lower flange, said front upright members extending forwardly to and curved to conform to the shape of the scraper blade, whereby the thrust from the blade is transmitted through the upright members to the carriage independently of said pivotal connection, and means for locking the carriage against rolling movement on the trackway when desired.

9. The combination with a tractor, of a U-shaped frame the legs of which extend alongside the tractor and are pivotally connected thereto near their free ends and the curved part of which is disposed in front of the tractor, a hoist on the tractor for raising and lowering said frame and holding it in various positions of vertical adjustment, a carriage mounted to turn on said curved part of said frame, means for holding the carriage against turning movement on said frame when desired, and a scraper blade carried by said carriage.

10. The combination with a tractor, of a U-shaped frame the legs of which extend alongside the tractor and are pivotally connected thereto near their free ends and the curved part of which is disposed in front of the tractor, a hoist on the tractor for raising and lowering said frame and holding it in various positions of vertical adjustment, a carriage mounted to turn on said curved part of said frame, means for holding the carriage against turning movement on said frame when desired, and a scraper blade pivotally connected near its upper edge to said carriage and depending therefrom.

11. The combination with a tractor, of a U-shaped frame the legs of which extend alongside the tractor and are pivotally connected thereto near their free ends and the curved part of which is disposed in front of the tractor, a hoist on the tractor for raising and lowering said frame and holding it in various positions of vertical adjustment, a carriage mounted to turn on said curved part of said frame, means for holding the carriage against turning movement on said frame when desired, a scraper blade pivotally connected near its upper edge to said carriage and depending therefrom, and means on the carriage to limit the swinging movement of said scraper blade.

In testimony whereof I have affixed my signature.

VINCENT P. MARRAN.